Patented Dec. 22, 1936

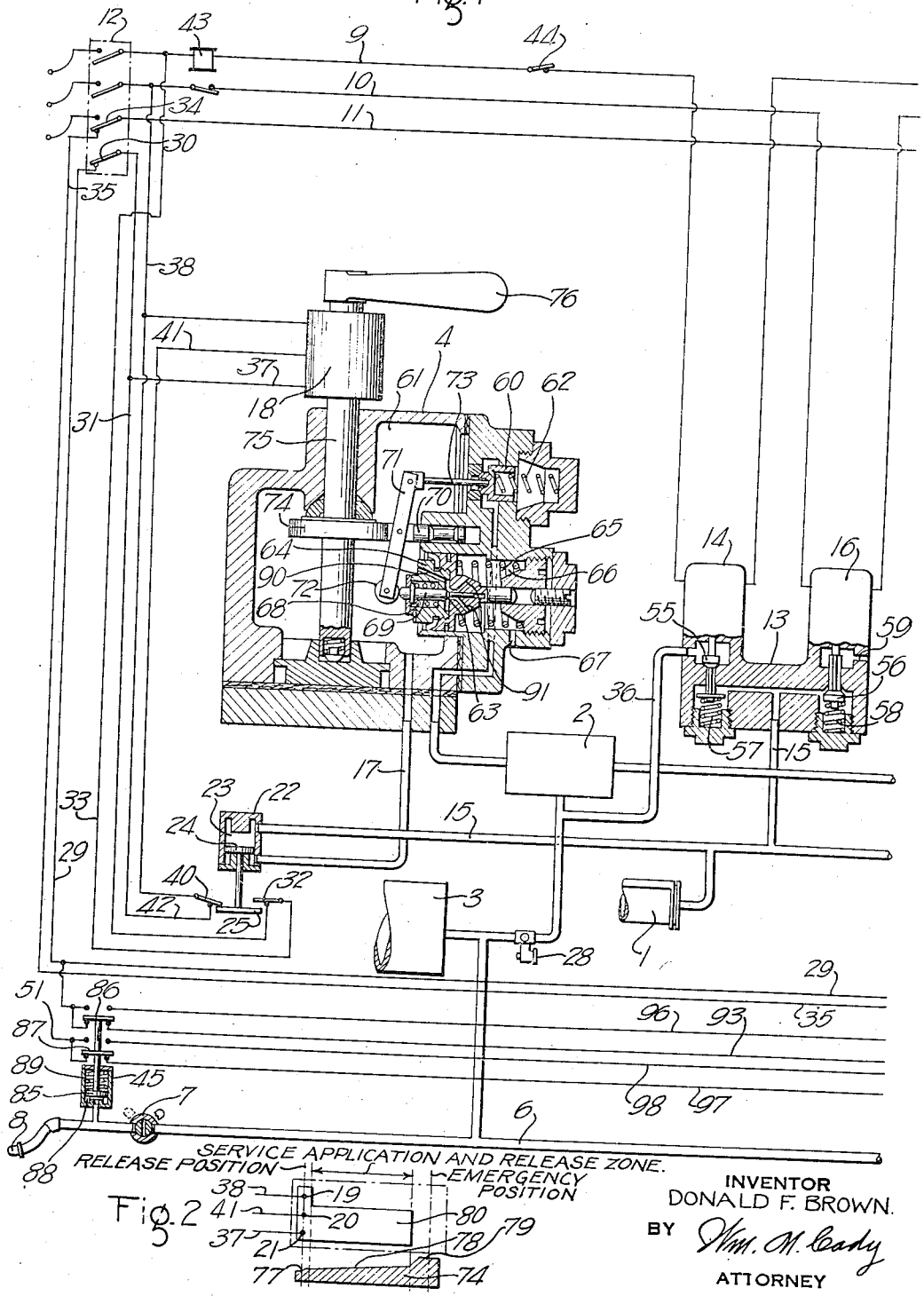

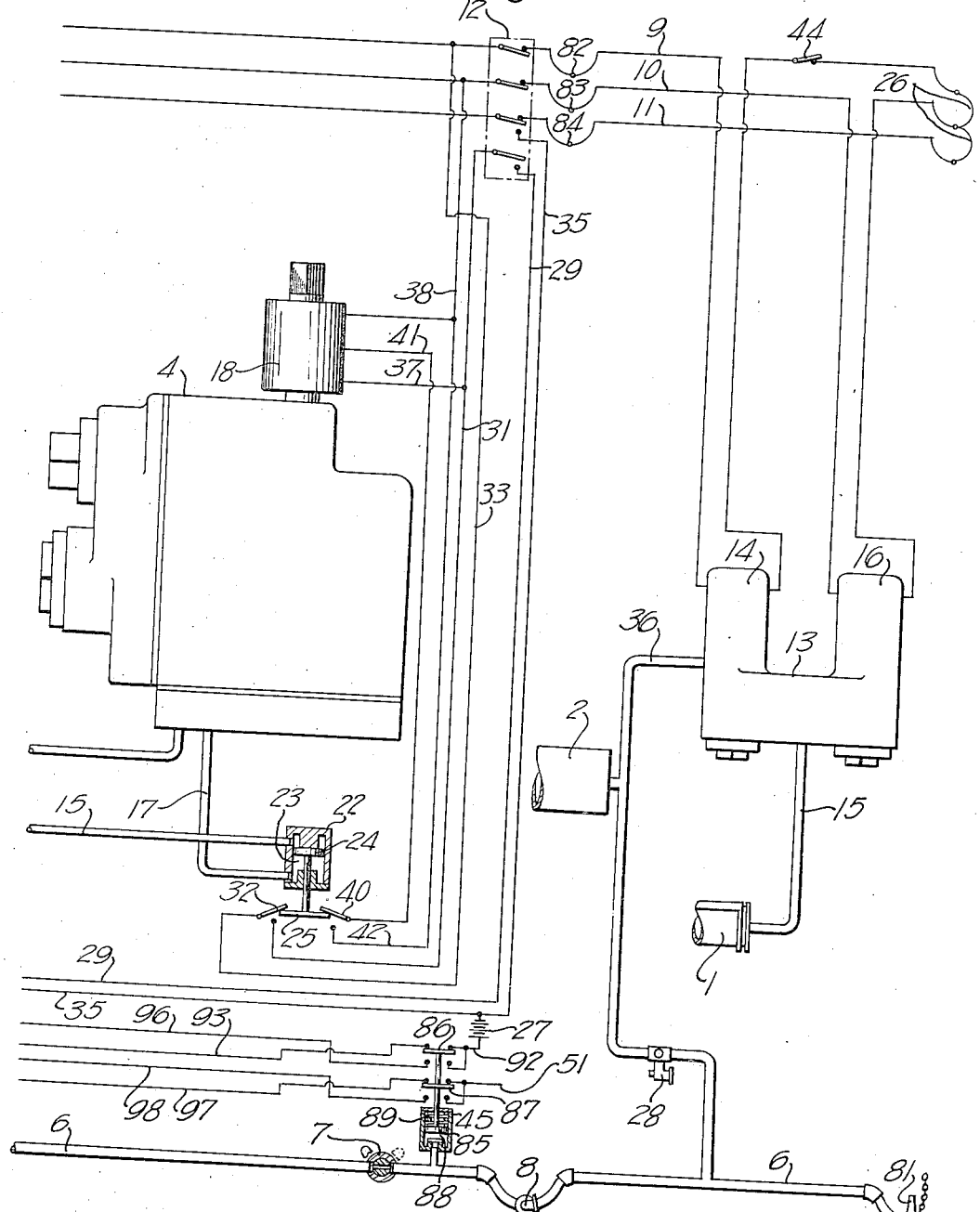

2,065,209

UNITED STATES PATENT OFFICE 2,065,209

ELECTRO-PNEUMATIC BRAKE

Donald F. Brown, King's Cross, London, England, assignor to The Westinghouse Air Brake Company, Wilmerding, Pa., a corporation of Pennsylvania Application February 26, 1935, Serial No. 8,309
In Great Britain February 27, 1934

6 Claims. (Cl. 303—15)

This invention relates to electro-pneumatic braking apparatus for railway vehicles and the like of the kind in which the brakes are arranged to be applied on individual vehicles of a train by fluid pressure under the control of electrically or electro-pneumatically actuated valve devices provided on the individual vehicles which are arranged to be actuated so as to effect an application or release of the brakes by the appropriate manipulation of an operator's control device or devices provided on one or more of the vehicles.

Such electrical control of the brakes has the advantage of enabling a rapid application and release of the brakes to be obtained, on each individual vehicle throughout a train, but in braking apparatus of the kind to which reference has been made the degree of braking pressure obtained depends solely upon the action of the driver who has to exercise considerable skill and judgment as regards moving the operator's control device to its lap position in which the brakes are held applied, more particularly as the braking action is transmitted so rapidly throughout the train.

According to the principal feature of the present invention it is proposed to provide arrangements which shall automatically ensure an application of the brakes and the holding of the brakes applied at a predetermined fluid pressure dependent upon the degree of movement of an operator's self-lapping control device, that is to say, for example dependent upon the position to which the control handle of said device is moved.

The invention is illustrated by way of example in the accompanying drawings, Figs. 1–1A of which is a diagrammatic view of an electro-pneumatic brake equipment for a motor vehicle and a trailer vehicle of a train and embodying the invention, and Fig. 2 is a development view showing diagrammatically certain parts of the operator's control device shown in Fig. 1.

As shown in the drawings, the motor vehicle of the train is provided with fluid pressure braking apparatus comprising a brake cylinder 1, a main reservoir 3, an operating reservoir 2, a feed valve device 28 for supplying fluid at reduced pressure from said main reservoir 3 to said operating reservoir 2, and an operator's control device at each end of the vehicle.

The main reservoir 3 is arranged to be supplied with fluid under pressure in any suitable manner and is connected to a main reservoir pipe 6 which extends throughout the train and which is provided with the usual end cocks 7 and hose couplings 8.

Also extending throughout the train are three train wires viz. an application wire 9, a release wire 10 and a return wire 11, each of which is connected to a corresponding switch contact in a cut-out switch device 12 at each end of the motor vehicle. The cut-out switch device 12 has a cut-in position in which the contacts of the device occupy the position shown in Fig. 1A of the drawings, so that the continuity of the train wires 9, 10, 11 to the next vehicle is completed as shown. The switch device 12 also has a cut-out position in which the contacts of the device occupy the position shown in Fig. 1 of the drawings.

The supply of fluid under pressure to the brake cylinder 1 from the operating reservoir 2 and the release of fluid from the brake cylinder 1 to the atmosphere is arranged to be controlled by an electro-magnetic valve device 13 comprising an application valve 55 controlled by an application magnet 14 and a release valve 56 controlled by a release magnet 16. The application valve 55 is so arranged that when the application magnet 14 is deenergized, a spring 57 acts to unseat said valve so as to open communication between the reservoir 2 and a pipe 15 which leads to the brake cylinder 1, this communication being closed when the magnet 14 is energized.

The release valve 56 is so arranged that when the release magnet 16 is deenergized, a spring 58 is adapted to seat said valve so as to close communication between the pipe 15 and an atmospheric port 59, while when the magnet 16 is energized the communication between pipe 15 and the atmospheric port 59 is established.

The application magnet 14 is connected in series in the application train wire 9 and the release magnet 16 is similarly connected in series in the release train wire 10 as shown.

Each of the operator's control devices 4 includes a self-lapping brake valve device which comprises a casing containing an application valve 60 adapted when unseated to supply fluid under pressure from the operating reservoir 2 to a chamber 61, a spring 62 for urging said valve to its seat, and a release valve 63 adapted when unseated to release fluid under pressure from said chamber to the atmosphere. The release valve 63 is contained in a movable abutment 64 which is subject on one side to variations in fluid pressure in chamber 61 and subject on the opposite side to the pressure of a regulating spring 65 contained in chamber 66 which is vented to the atmosphere through an atmospheric exhaust passage 67. A spring 68 is provided in the abutment 64 and acts on a stem 69 carrying the release valve 63 for unseating said release valve.

A plunger 70 is slidably mounted in the brake valve casing and a rocking beam 71 is pivotally connected near its center to said plunger. A roller 72 is provided in one end of the beam 71 and is adapted to engage the end of the release valve stem 69. A rod 73 is provided with one end pivotally connected to the other end of the beam 71, while the other end of the rod 73 engages the application valve 60.

The outer end of the plunger 70 is adapted to ride the peripheral surface of a cam 74 which is provided on a shaft 75. The shaft 75 is journaled in the casing and extends through one wall of the casing, and a handle 76 is provided on the outer end thereof for manually turning said shaft and thereby the cam 74 to various brake controlling positions which are indicated diagrammatically in Fig. 2 of the drawings. In Fig. 2, a development view of the peripheral surface of the cam 74 is shown and from this view it will be noted that in the release position of the handle 76 a recess 77 is provided to receive the end of the plunger 70 which defines said position. The cam is provided with a surface 78 extending from the recess 77 through the service application and release zone which surface gradually rises and is adapted to urge the plunger 70 in a direction away from the shaft 75 a distance depending upon the extent of movement of the handle 76 in said zone. There is then a sharp rise on the cam 74 from the surface 78 to a surface 79 which is engaged by the plunger 70 upon movement of the handle to the emergency position.

Associated with each of the self-lapping brake valve devices just described is a switch device 18 which, as shown in Fig. 2 of the drawings, may comprise a contactor 80 carried by and thereby movable with the shaft 75. The contactor 80 is adapted in release position to connect contacts 19, 20 and 21 together, and in the service application and release zone to connect contacts 20 and 21 together, the contacts 19, 20 and 21 being connected to wires 38, 41 and 37, respectively.

Associated with each operator's control device 4 is an electro-pneumatic control device 22, which comprises a cylinder 23 containing a piston 24 having a piston rod or stem on the end of which is carried a member 25 preferably made of insulating material and adapted to operate switch contacts 32 and 40.

A pipe 17 connected to chamber 61 of the self-lapping brake valve device leads to the lower end of the cylinder 23 below the piston 24, while a pipe 15 connected to the brake cylinder 1 leads to the upper end of said cylinder.

The equipment on each of the trailer vehicles comprises an operating reservoir 2 supplied with fluid under pressure from the main reservoir pipe 6 through a feed valve device 28, and an electromagnetic valve device 13 like that employed on the motor vehicle and in which the application and release magnets 14 and 16 are connected in series with the application and release train wires 9 and 10, respectively, and are operative to control the supply of fluid under pressure from the reservoir 2 to a brake cylinder 1 and the release of fluid therefrom to the atmosphere.

The main reservoir pipe 6 on the motor car is connected to that on the trailer by the usual hose couplings 8 and in operation the end cock 7 at the rear end of the motor vehicle is normally open and that at the front end of the motor vehicle is normally closed, while at the rear end of the trailer the end hose coupling 8 is closed by a dummy coupling 81 in the usual well known manner. The train wires 9, 10 and 11 on the motor car are connected to the corresponding wires on the trailer by means of suitable connectors 82, 83 and 84, respectively, while at the end of the trailer said wires are connected together by a bridge connector 26.

At each end of the motor vehicle there is provided an interlock switch device 45 which comprises a cylinder containing a piston 85 adapted to operate two switch contacts 86 and 87. The piston 85 has at one side a chamber 88 connected to the main reservoir pipe 6 at a point outside of the end cock 7, and has at the opposite side a chamber containing a spring 89 for urging said piston to a certain position. When a motor vehicle is connected to a trailer vehicle as shown in Figs. 1–1A of the drawings, and the end cocks 7 are positioned as above described, the piston chamber 88 of the interlock switch device 45 at the head end of the motor vehicle is vented through the open end of the main reservoir pipe 6 so that spring 89 holds the contacts 86 and 87 in the position shown in Fig. 1 of the drawings, while at the rear end of the motor vehicle, the piston 85 of said device is operated by fluid under pressure from the main reservoir pipe 6 to position the contacts 86 and 87 as shown in Fig. 1A of the drawings. The function of these interlock switch devices 45 will be hereinafter described in greater detail.

A suitable source of electric current such for instance as a battery 27 is provided on the motor vehicle for energizing the train wires and the operation of the apparatus as so far described is as follows:—

The main reservoir pipe 6 is charged with fluid under pressure from the main reservoir 3 and each of the operating reservoirs 2 on the motor and trailer vehicles is supplied with fluid at a suitably reduced pressure from the pipe 6 through the reducing valves 28.

Assuming that the operation of the braking apparatus is to be controlled from the operator's control device 4 shown in Fig. 1, the switch devices 12 are positioned as shown in the drawings and said operator's control device is turned to the release position. In this position of the operator's control device 4, chamber 61 in the brake valve device and the connected chamber at the lower side of the piston 24 in the device 22 are vented to the atmosphere through port 90 in the abutment 64, past the release valve 63, through ports 91 in said abutment, chamber 66 and from thence to the atmosphere through the atmospheric passage 67, and the contacts 19, 20, 21 are electrically connected with one another by the contact 80 as hereinbefore described.

A circuit is thereupon completed from the positive terminal of battery 27 through wire 92, contact 86 in the interlock switch 12 shown in Fig. 1A, wire 93, contact 86 in the interlock switch shown in Fig. 1, wire 29, contact 30 of the cut-out switch device 12 shown in Fig. 1, wire 31, contact 32 of the control device 22, wire 33, application train wire 9, the application magnets 14 of all the valve devices 13 throughout the train in series with each other, the bridge connector 26 at the rear end of the train, return train wire 11, switch contact 34 of the front switch device 12, and wire 35 to the negative terminal of the battery 27.

The application magnets 14 are thus energized and the corresponding application valves 55 of the devices 13 are held closed to cut off communication between the pipe 36 leading from the operating reservoir 2 to the pipe 15 leading to the brake cylinder 1 on each vehicle of the train.

A circuit is also completed from the wire 31 through wire 37 contacts 21 and 19 and contactor 80 of the operator's control device 4, wire 38, release train wire 10, the release magnets 16 on each vehicle in series with one another, bridge connector 26, return train wire 11 and switch contact 34 to the negative terminal of the battery 27 so that the release magnets 16 are all energized and the corresponding release valves 56 of the devices 13 are held open to establish communication between the brake cylinder pipe 15 and the atmosphere on each vehicle of the train.

It will thus be evident that the brake cylinder 1 on each vehicle is open to the atmosphere and the brakes are thus released.

Since as above explained the pipe 17 leading to the cylinder 23 of the control device 22 shown in Fig. 1 is also open to the atmosphere by way of chamber 61 in the self-lapping brake valve device, the pressures on the upper and lower sides of the piston 24 of the control device will be normally at atmospheric pressure and the member 25 will be maintained by gravity in the position shown.

If it is desired to effect a service application of the brakes, the handle 76 is turned into the service application and release zone to a position depending upon the degree of brake application desired. The consequent operation of the cam 75 operates the plunger 70 and thereby the beam 71 which first acts to seat the release valve 63 against the pressure of spring 68 and which then fulcrums on the end of the release valve stem 69 and acts to unseat the application valve 60.

With the application valve 60 unseated fluid under pressure flows from the operating reservoir 2 to chamber 61 and from thence through pipe 17 to the chamber at the lower side of the piston 24 in the device 22.

The pressure of fluid thus obtained in chamber 61 acts on the abutment 64 and moves said abutment outwardly against the pressure of the regulating spring 65. With the handle 76 and therefore cam 74 moved to a certain position in the service application and release zone, the continued movement of the abutment 64 permits the spring 62 to seat the application valve at the time the pressure obtained in chamber 61 and in the device 22 below the piston 24 attains the desired value corresponding to the position of the handle 76.

The pressure obtained in the pipe 17 acting on the underside of the piston 24 in the cylinder 23 of the control device 22 causes the piston 24 to move upwardly thereby opening the contact 32 by means of the member 25. The circuit of the application train wire 9 is thus interrupted at the contact 32 and the application magnets 14 throughout the train are thus deenergized.

With the operator's control device 4 in its service applicaiton and release zone, the connection between the contacts 21 and 19 is interrupted with the result that the circuit leading from the wire 31 to wire 38 and thereby the release train wire 10 is interrupted so that the train wire 10 and the release magnets 16 throughout the train are deenergized.

The deenergization of the release magnets 16 as above explained permits the release valves 56 of the devices 13 to be closed by springs 58, thereby cutting off communication between each brake cylinder 1 and the atmosphere while the deenergization of the application magnets 14 permits the application valves 55 of the devices 13 to be opened by springs 57, thereby effecting the supply of fluid under pressure from the reservoir 2 on each vehicle through the pipe 36 to the pipe 15 and from thence to the corresponding brake cylinder 1.

The brakes on each vehicle are thus applied and the pressure established in the brake cylinder 1 on the motor vehicle is transmitted through the pipe 15 to the cylinder 23 of the control device 22 and acts upon the upper side of the piston 24. As soon as this pressure acting in the device 22 shown in Fig. 1 is substantially equal to or slightly exceeds the pressure acting on the underside of the piston 24 corresponding to the pressure in the pipe 17, the piston 24 is moved downwardly sufficiently to permit the contact 32 to be closed so that the application train wire 9 is again energized. The application magnets 14 on each vehicle are consequently reenergized and the corresponding application valves 55 are closed, thereby cutting off the further supply of fluid under pressure from the reservoirs 2 to the brake cylinders 1.

The release magnets 16 under these conditions are maintained deenergized so that the corresponding release valves are held closed.

It will now be seen that the brake cylinder 1 on each vehicle of the train is supplied with fluid under pressure from its operating reservoir 2 until a brake cylinder pressure is established which corresponds to the pressure obtained in chamber 61 as governed by the position of the handle 76 in the service application and release zone.

If the handle 76 is moved only to some intermediate position in the service application and release zone to effect the application of brakes above described and it is desired to increase the degree of application, then the handle 76 is moved further into said zone. The consequent movement of the cam 74 and plunger 70 again operates the beam 71 to unseat the application valve 60 so as to increase the pressure in chamber 61 to a degree depending upon the new position of said handle.

The increase in pressure in chamber 61 and therefore in the control device 22 acting below the piston 24 moves said piston upwardly and again opens the contact 32. The application magnets 14 throughout the train are thereby again deenergized to supply fluid under pressure to the brake cylinders 1 so as to increase the degree of the brake application. When, on the motor vehicle, the pressure in the brake cylinder 1 and in the device 22 acting on the upper face of the piston 24 is thus increased to substantially the degree acting on the lower face of said piston, said piston is again moved downwardly to permit the contact 32 to close and thus energize the application magnets 14 throughout the train so as to prevent further flow of fluid to the brake cylinders 1.

In the manner above described the brakes may be applied in such increments as desired by successive movements of the handle 76 in the service application and release zone, since the device 22 operates according to the pressure obtained in chamber 61 upon such movements to provide a corresponding pressure in the brake cylinders 1 throughout the train.

If it is desired to effect a release of the brakes after an application, the handle 76 is turned either directly to the release position or moved to said position in a series of successive steps in order to provide a graduated release of the brakes.

As the handle 76 is moved toward release position the cam 74 is operated to relieve pressure on the plunger 70 which permits spring 68 to act to unseat the release valve 63 and thereby permit venting of fluid under pressure from the chamber 61 and thereby the chamber at the lower face of piston 24 in the control device 22 to the atmosphere by way of passage 90 in the abutment 64, past the release valve 63, through ports 91, chamber 66 and atmospheric passage 67.

As the pressure of fluid in chamber 61 is thus reduced on the abutment 64, the regulating spring 65 moves said abutment towards the left hand, and in case the handle 76 is still in the service application and release zone said abutment moves into seating engagement with the release valve so as to hold a reduced pressure in chamber 61 corresponding to the position of the handle 76. If the handle 76 is then moved another step towards the release position the release valve 63 is again unseated to permit a further reduction in pressure in chamber 61 corresponding in degree to the movement of said handle. The handle 76 may be thus operated to relieve the pressure in chamber 61 and acting on the lower face of piston 24 in such increments as desired. When the handle 76 is moved to the release position, however, the spring 65 acting on the abutment 64 becomes expanded to its free condition without seating the release valve 63 so that a complete release of fluid under pressure from chamber 61 is thus obtained when the handle 76 is moved to release position.

When the pressure in chamber 61 is reduced by operation of the handle 76, as above described, the corresponding reduction in pressure below the piston 24 of the control device 22 permits brake cylinder pressure acting on the upper face of said piston to move said piston downwardly and close contact 40, the contact 32 remaining closed. A circuit is thus completed from the positive terminal of the battery 27 through the interlock switch devices 45, wire 29, contact 30, wires 31 and 37, contacts 21 and 20 in the operator's control device 4, wire 41, contact 40, wires 42 and 38, release train wire 10, through the release magnets 16 connected in series in said train wire, rear end connector 26, return wire 11, contact 34 in the switch device 12 and wire 35 to battery 27. The release magnets 16 throughout the train are consequently energized and operate to unseat the release valves 56, thereby effecting the release of fluid under pressure from the brake cylinders 1 to the atmosphere.

If the handle 76 is operated to release the brakes in steps, then as soon as the pressure in the brake cylinder 1 and in the chamber above piston 24 in device 22 on the motor vehicle is reduced to a slightly lower degree than that acting in chamber 61 and in the chamber below said piston, said piston is moved upwardly and opens the contact 40 and consequently the circuit through the release magnets 16. The release magnets 16 are thereby deenergized, which permits springs 58 to seat the release valves 56 and cut off further release of fluid from the brake cylinders.

A further reduction in pressure in chamber 61 and in the chamber below the piston 24 by operation of the handle 76 in the manner hereinbefore described will cause the device 22 to again operate to effect a corresponding reduction in pressure in the brake cylinders 1 throughout the train, as will be evident, while if the handle is moved to the release position, thereby completely venting chamber 61 and the chamber below the piston 24 in device 22, the contact 40 will remain closed so that a complete release of the brakes will be effected.

It will now be noted that by adjusting the setting of the operator's control device 4 while in its service application and release zone, so as to vary the pressure of the fluid supplied to the pipe 17 the pressure in the brake cylinders 1 throughout the train will be correspondingly and automatically adjusted so as to graduate the application and release of the brakes.

When it is desired to effect an emergency application of the brakes the handle 76 is turned to emergency position in which the raised portion 79 on the cam 74 operates the plunger 70 to unseat the application valve 60 to supply fluid under pressure to chamber 61 and the chamber below piston 24 in the device 22 and thereby operate said device to open the contact 32 to effect an application of the brakes as hereinbefore described in connection with effecting a service application of the brakes. The raised portion 79 on the cam 74 moves the plunger 70 to such a degree however that insufficient movement of the abutment 64 will be obtained by the full pressure of the operating reservoir 2 acting thereon to permit closure of the application valve 60, thereby ensuring operating reservoir pressure being obtained at the lower side of the piston 24 in the device 22, so that the device 22 will maintain the contact 32 open and permit a pressure to be built up in the brake cylinders 1 in the train equal to that obtained in the operating reservoirs 2.

In emergency position of the handle 76 the contacts 20 and 21 are disconnected from each other so as to ensure that the release magnets 16 throughout the train will not be energized and thereby effect an undesired release of an emergency application of the brakes in case for any reason the device 22 should fail and permit closure of the release contact 40.

A release of the brakes after an emergency application is effected in the same manner as after a service application, that is by moving the handle 76 either directly to the release position or in a series of successive steps to the release position, in either case the contact 40 being operated to close the circuit through the release magnets 16. In this connection it will be noted that in the release position the release train wire 10 is energized independently of the contact 40 by the contact 80 in the operator's control device 4 connecting contacts 21 and 19, and the purpose of this is to ensure that the release magnets 16 will be maintained energized to effect a complete release of brakes after the brake cylinder pressure has become reduced to such a low degree that the device 22 might not readily respond to a further change in pressure below the piston 24 to close the contact 40.

Since an application of the brakes is effected by opening the circuit through the application and release train wires 9 and 10, respectively, it will be evident that failure of the battery 27 or a break in the energizing circuit of the application magnets 14 will permit the application valves 55 to operate to supply fluid under pressure to the brake cylinders 1 to apply the brakes. In order to ensure that the release magnets will be deenergized under this condition to prevent fluid being released from the brake cylinders 1, a magnet 43 is connected in series in the application train wire 9 and controls a switch 95 in the release train wire 10, said magnet being operative upon deenergization to open said switch and thereby the circuit through the release magnets 16 in the train so as to permit the release valves 56 to close and thereby hold the fluid under pressure in the brake cylinders 1.

The application train wire 9 is also provided with a switch 44 on each vehicle which is adapted to be operated by a trainman or passenger for effecting the deenergization of the train wire 9 so as to cause an application of the brakes throughout the train.

If the motor vehicle is turned around with respect to the train from the position shown in the drawings, then with the switch devices 12, end cocks 7 and interlock switch devices 45 properly conditioned, that is, just the reverse from that shown in the drawings and hereinbefore described, the brakes on the train may be controlled by the operator's control device 4 and the device 22 shown in Fig. 1A of the drawings. It will be noted that at the non-operating end of the motor vehicle the handle 76 is removed from the operator's control device 4 which prevents unintentional or malicious interference with the control of brakes from the other end of the vehicle.

In order to ensure an application of the brakes being automatically effected in the event of the fluid pressure failing to be maintained in the main reservoir pipe 6 the interlock switch devices 45 are provided. As long as the pressure in the main reservoir pipe 6 is maintained equal to or above that desired, said pressure acting in chamber 88 on the piston 85 of the interlock switch device 45 at the rear of the motor car, shown in Fig. 1A of the drawings, holds said piston and thereby the contact 86 in the position shown for closing the circuit through the application magnets 14 in the manner hereinbefore described, but if the pressure in the main reservoir pipe should become reduced for any reason sufficiently for the spring 89 to move the piston 85 to its lower position, the contact 86 will be opened, thereby opening the circuit through the application train wire 9 and causing an application of the brakes to be effected. If the motor vehicle is operated from the other end as hereinbefore described in connection with the operator's control devices 4, then the positions of the interlock switch devices 45 will be reversed from that shown in the drawing, in which case the application train wire circuit will be closed by the contact 86 on said devices through a wire 96 instead of the wire 93. As will be seen the interlock switch devices 45 also constitute an interlocking arrangement ensuring that the coupling cocks 7 are in their correct relative positions when a motor vehicle is coupled to a train.

The contacts 87 on the interlock switch devices 45 are provided to control the traction circuit 51 of the motor vehicle, which circuit is closed either through wire 97 or wire 98 according to which end of the motor vehicle is the operating end, so that in the event of an automatic application of the brakes being effected due to the pressure in the main reservoir pipe 6 becoming reduced to such an extent that the interlock switch device at the non-operating end of the vehicle operates, the vehicle motors will be simultaneously rendered inoperative.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In an electro-pneumatic brake apparatus, in combination, a brake cylinder, an application magnet valve device operative upon deenergization to supply fluid under pressure to said brake cylinder, a release magnet valve device operative upon energization to release fluid under pressure from said brake cylinder, an application switch contact operative when closed to effect the energization of said application magnet valve device, a release switch contact operative when closed to effect the energization of said release magnet valve device, means controlled by the fluid pressure in said brake cylinder and an opposing fluid pressure and operative upon a preponderance of said opposing fluid pressure to close said application switch contact and open said release switch contact, and operative upon a preponderance of brake cylinder pressure to close said release switch contact and open said application switch contact, and manually operable means for varying the degree of said opposing fluid pressure.

2. In an electro-pneumatic brake apparatus, in combination, a brake cylinder, electro-responsive means, an application contact operative to effect the operation of said electro-responsive means to supply fluid under pressure to said brake cylinder, a release contact operative to effect the operation of said electro-responsive means to release fluid under pressure from said brake cylinder, a self-lapping brake valve device comprising a handle and valve means conditioned by said handle to supply fluid at a pressure corresponding to the extent of movement of said handle, and means controlled by the opposing pressures supplied by said brake valve device and acting in said brake cylinder for controlling said contacts and operable when the pressure supplied by the brake valve device exceeds that in said brake cylinder to operate said application contact to supply fluid under pressure to the brake cylinder, and operative when brake cylinder pressure exceeds that supplied by the brake valve device to operate said release contact to effect the release of fluid under pressure from said brake cylinder, said brake valve handle having a release position, and a contact operated in said release position to effect the operation of said electro-responsive means to release fluid under pressure from said brake cylinder independently of said release contact.

3. In an electro-pneumatic brake apparatus, in combination, an application train wire, a release train wire, electro-responsive means operative upon deenergization of said train wires to effect an application of the brakes and operative upon energization of said train wires to effect a release of the brakes, manually operated means for controlling the energization and deenergization of said train wires, a switch in circuit with one of said wires, and a magnet in circuit with the other wire operative upon deenergization to open said switch and thereby the circuit including said switch.

4. In an electro-pneumatic brake apparatus, in combination, an application train wire, a release train wire, electro-responsive means operative upon deenergization of said train wires to effect an application of the brakes and operative upon energization of said train wires to effect a release of the brakes, manually operated means for controlling the energization and deenergization of said train wires, a magnet in circuit with said application train wire, and a switch controlled by said magnet for controlling the circuit through said release train wire, said switch being operative upon energization of said application train wire and thereby said magnet for closing the circuit through said release train wire and upon deenergization of said application train wire to open the circuit through said release train wire.

5. In an electro-pneumatic brake system for a train including at least a motor vehicle adapted to be controlled from either end and a trailer, in combination, electro-responsive means on said motor vehicle and trailer operative upon deenergization to effect an application of the brakes and upon energization to effect a release of the brakes, a main reservoir, a main reservoir pipe extending through the train and charged with fluid under pressure from said main reservoir, means for closing the main reservoir pipe at the rear end of the train, a cut-out valve in said main reservoir pipe at each end of said motor vehicle, the cut-out valve at the front end of the motor vehicle being normally closed and that at the rear end of the motor vehicle being normally open, switch means for controlling the operation of said electro-responsive means, and means controlled by the pressure of fluid acting in said main reservoir pipe at the front of the motor vehicle beyond the front cut-out valve and at the rear of motor vehicle to the rear of the rear cut-out valve for controlling the operation of said switch means, said means being operative when the pressure in the main reservoir pipe to the rear of the rear cut-out valve exceeds a predetermined degree to operate said switch means to effect the energization of said electro-responsive means, and when less than a predetermined degree to operate said switch means to effect deenergization of said electro-responsive means.

6. In an electro-pneumatic brake system for a train including at least a motor vehicle, adapted to be controlled from either end, and a trailer, in combination, a main reservoir, a main reservoir pipe extending through the train and charged with fluid under pressure from said main reservoir, means closing the end of said pipe at the rear end of the train, a cut-out valve in said main reservoir pipe at the front of the motor vehicle closing said main reservoir pipe, a cut-out valve in said main reservoir pipe at the rear of the motor vehicle opening communication between the main reservoir pipe on the motor vehicle and that on the trailer, switch means for controlling the motive power circuit on the motor vehicle, and means controlled by the pressure of fluid in the main reservoir pipe at the front of the motor vehicle beyond the front cut-out valve and in said pipe at the rear of the motor vehicle beyond the rear cut-out valve for controlling the operation of said switch means, said means being operative when the pressure in the main reservoir pipe to the rear of the rear cut-out valve exceeds a predetermined degree to operate said switch means to close said power circuit, and when less than a predetermined degree to operate said switch means to open said power circuit.

DONALD F. BROWN.